(12) United States Patent
Shiraki (10) Patent No.: US 8,320,347 B2
(45) Date of Patent: Nov. 27, 2012

(54) WIRELESS COMMUNICATION DEVICE AND COMPUTER USABLE MEDIUM THEREFOR

(75) Inventor: Tomomi Shiraki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 283 days.

(21) Appl. No.: 12/630,132

(22) Filed: Dec. 3, 2009

(65) Prior Publication Data

US 2010/0142502 A1  Jun. 10, 2010

(30) Foreign Application Priority Data

Dec. 4, 2008  (JP) .................................. 2008-310334

(51) Int. Cl.
*H04W 4/00* (2009.01)
(52) U.S. Cl. .................. 370/338; 370/328; 370/310
(58) Field of Classification Search .................. 370/338
See application file for complete search history.

(56) References Cited

U.S. PATENT DOCUMENTS

| | | | |
|---|---|---|---|
| 7,444,158 B2 | 10/2008 | Shitama et al. | |
| 2005/0068928 A1 | 3/2005 | Smith et al. | |
| 2005/0148326 A1 | 7/2005 | Nogawa et al. | |
| 2006/0023693 A1 | 2/2006 | Aso et al. | |
| 2006/0106918 A1 | 5/2006 | Evert et al. | |
| 2006/0230279 A1* | 10/2006 | Morris | 713/182 |
| 2007/0073868 A1* | 3/2007 | Nelson et al. | 709/224 |
| 2009/0085806 A1* | 4/2009 | Piersol et al. | 342/386 |

FOREIGN PATENT DOCUMENTS

| | | |
|---|---|---|
| EP | 1 542 400 A2 | 6/2005 |
| EP | 1 542 400 A3 | 6/2005 |
| JP | 2005-033285 | 2/2005 |
| JP | 2005-039571 | 2/2005 |
| JP | 2005-176100 A | 6/2005 |
| JP | 2006-141012 | 6/2006 |
| JP | 2007-228537 | 9/2007 |
| WO | 2004-066560 A1 | 8/2004 |
| WO | 2008/061347 A1 | 5/2008 |

OTHER PUBLICATIONS

Notice of Reasons for Rejection dated Sep. 7, 2010 in Japanese Application No. 2008-310334 and English translation thereof.
EP Office Action dated Jul. 1, 2011, corresponding EP Application No. 09177822.5.

* cited by examiner

*Primary Examiner* — Dang Ton
*Assistant Examiner* — Pamit Kaur
(74) *Attorney, Agent, or Firm* — Banner & Witcoff, Ltd.

(57) ABSTRACT

A wireless communication device is provided. The wireless communication device includes a first obtainer configured to obtain an identifier of a wireless network to which a first external device belongs, the identifier of the wireless network being detected based on radio waves transmitted from the first external device, a second obtainer configured to obtain an identifier of a wireless network to which a second external device belongs, the identifier of the wireless network being obtained from the second external device through an IP network to which the wireless communication device has been connected, and an output controller configured to output a first identifier obtained commonly by the first obtainer and the second obtainer to an output unit so that the first identifier is presented to be distinguishable from other identifiers obtained by solely one of the first obtainer and the second obtainer.

11 Claims, 7 Drawing Sheets

SCREEN 4

Wireless Settings

The wireless networks listed below are available to the device.
Select a wireless network you wish to connect the device to and press "Next."

| (*) | SSID | Channel | Signal intensity | Encryption |
|---|---|---|---|---|
| ☆ | WNWAP_A | 11 | ■■■■□ | Encrypted |
|  | WNWAP_C | 5 | ■■■■□ | Encrypted |
|  |  |  |  |  |

The SSID with a star (☆) mark in the asterisk (*) column indicates a wireless network, to which this computer is connected.

<Previous  Next>

FIG.8B

SCREEN 5

Wireless Settings

Enter an SSID of a wireless network you wish to connect the device to and press "Next".

SSID: [            ]

<Previous  Next>

WIRELESS COMMUNICATION DEVICE AND COMPUTER USABLE MEDIUM THEREFOR

CROSS REFERENCE TO RELATED APPLICATION

This application claims priority from Japanese Patent Application No. 2008-310334, filed on Dec. 4, 2008, the entire subject matter of which is incorporated herein by reference.

BACKGROUND

1. Technical Field

The present invention relates to a wireless communication device to be connected to a wireless network, specifically to a technique to output an identifier of the wireless network to the wireless communication device.

2. Related Art

A wireless LAN (local area network) has been widespread and utilized in network computing environment. Hereinafter, the wireless LAN will be referred to as a wireless network. In the network computing environment, a plurality of wireless LANs can be settled in an area. When a communication device is connected to one of the wireless networks, the communication device is required to have predetermined wireless settings installed. For example, when the communication device is selectively connected to one of the plurality of available wireless networks, a list of SSIDs (service set identifiers) can be created and presented to a user so that the user can select an available wireless network with reference to the list. The SSID is an identifier to identify the wireless network. The list of SSIDs can be created based on signals transmitted from various access points within the networks.

SUMMARY

When a plurality of wireless networks are available, and a large number of identifiers of the networks, e.g., the SSIDs, are detectable by the communication device, however, the user may be troubled by the large number of available options, and the user may not find a desirable network identifier easily.

In view of the above drawback, the present invention is advantageous in that a wireless communication device, in which the network identifiers are presented effectively to the user, is provided. Further, a technique to output the identifiers and a computer usable medium therefor are provided.

According to an aspect of the present invention, a wireless communication device is provided. The wireless communication device includes a first obtainer, configured to obtain an identifier of a wireless network, to which a first external device belongs, the identifier of the wireless network being detected based on radio waves transmitted from the first external device, a second obtainer, configured to obtain an identifier of a wireless network, to which a second external device belongs, the identifier of the wireless network being obtained from the second external device through an IP network to which the wireless communication device has been connected, and an output controller, configured to output a first identifier obtained commonly by the first obtainer and the second obtainer to an output unit so that the first identifier is presented to be distinguishable from other identifiers obtained by solely one of the first obtainer and the second obtainer.

According to another aspect of the present invention, a computer usable medium including computer readable instructions to control a wireless communication device is provided. The wireless communication device is controlled to execute steps of first obtaining an identifier of a wireless network, to which a first external device belongs, the identifier of the wireless network being detected based on radio waves transmitted from the first external device, second obtaining an identifier of a wireless network, to which a second external device belongs, the identifier of the wireless network being obtained from the second external device through an IP network to which the wireless communication device has been connected, and outputting a first identifier obtained commonly in the first obtaining step and the second obtaining step to an output unit so that the first identifier is presented to be distinguishable from other identifiers obtained in solely one of the first obtaining step and the second obtaining step.

DETAILED DESCRIPTION

Hereinafter, an embodiment according to an aspect of the present invention will be described with reference to the accompanying drawings.

Figure 1:
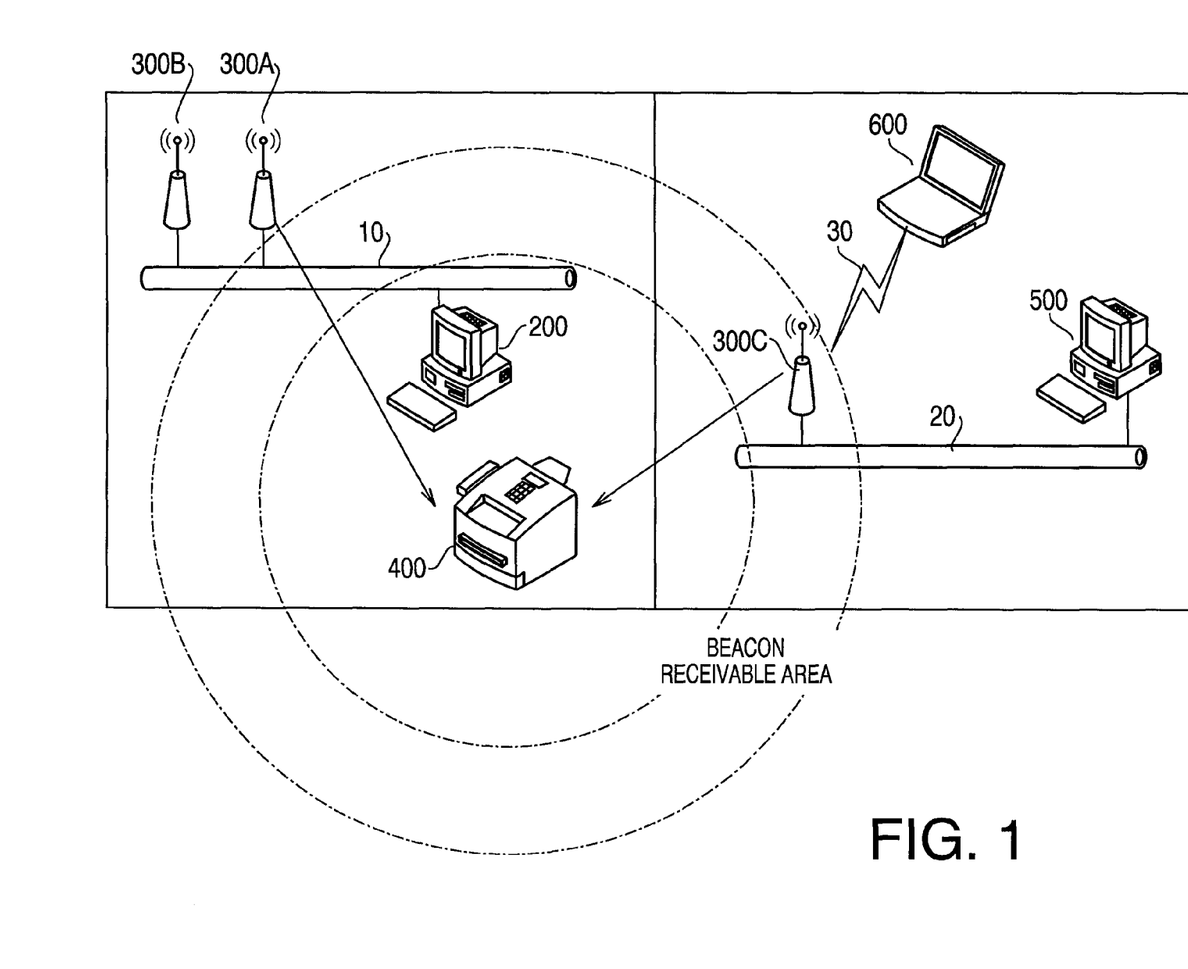
FIG. 1 is a schematic diagram to illustrate a network system according to an embodiment of the present invention.

Firstly, an overall configuration of a network system including an IP network 10 according to the embodiment of the present invention will be described. The IP network 10 includes a PC 200 and access points 300A, 300B. The PC 200 is connected with an MFP (multifunction peripheral) 400, which is equipped with a plurality of functions to, for example, print, scan, and/or copy images, through a USB (universal serial bus). However, the connection between the PC 200 and the MFP 400 is not limited to the USB connection, but may be achieved through, for example, a wired LAN cable. When the PC 200 is equipped with a wireless interface, for another example, the connection may be achieved through ad-hoc wireless communication. For another example, the PC 200 and the MFP 400 may be connected through the IP network 10.

In the present embodiment, the network system includes an IP network 20 in addition to the IP network 10. The IP network 10 and the IP network 20 are separate networks, which are constructed in a rather small area such as in a corporation building and adjoining residents. The IP network 20 includes an access point 30 and a PC 500, and the access point 300 provides wireless network 30 to a PC 600. Therefore, the PC 500 and the PC 600 are connected to each other through the access point 300C for data exchange. According to the present embodiment, the IP networks 10, 20 may be either a wired network (e.g., Ethernet; registered trademark) or a wireless network (e.g., IEEE802.11 network).

The MFP 400 is capable of receiving radio waves such as beacon signals produced by and transmitted from the access points 300A, 300C. In other words, the access points 300A, 300C are in a range in which the MFP 400 can receive their radio waves. Meanwhile, the MFP 400 is incapable of receiving radio waves produced by and transmitted from the access point 300B. In other words, the access point 300B is outside the range, in which the MFP 400 can receive radio waves from the access point 300B. According to the present embodiment, the beacon signals issued from the access point 300A/300B/300C include an SSID being an identifier to identify the wireless network provided by the access point. Hereinafter, the SSID to identify the wireless network provided by the access point will be referred to as an SSID of the access point.

Figure 2:
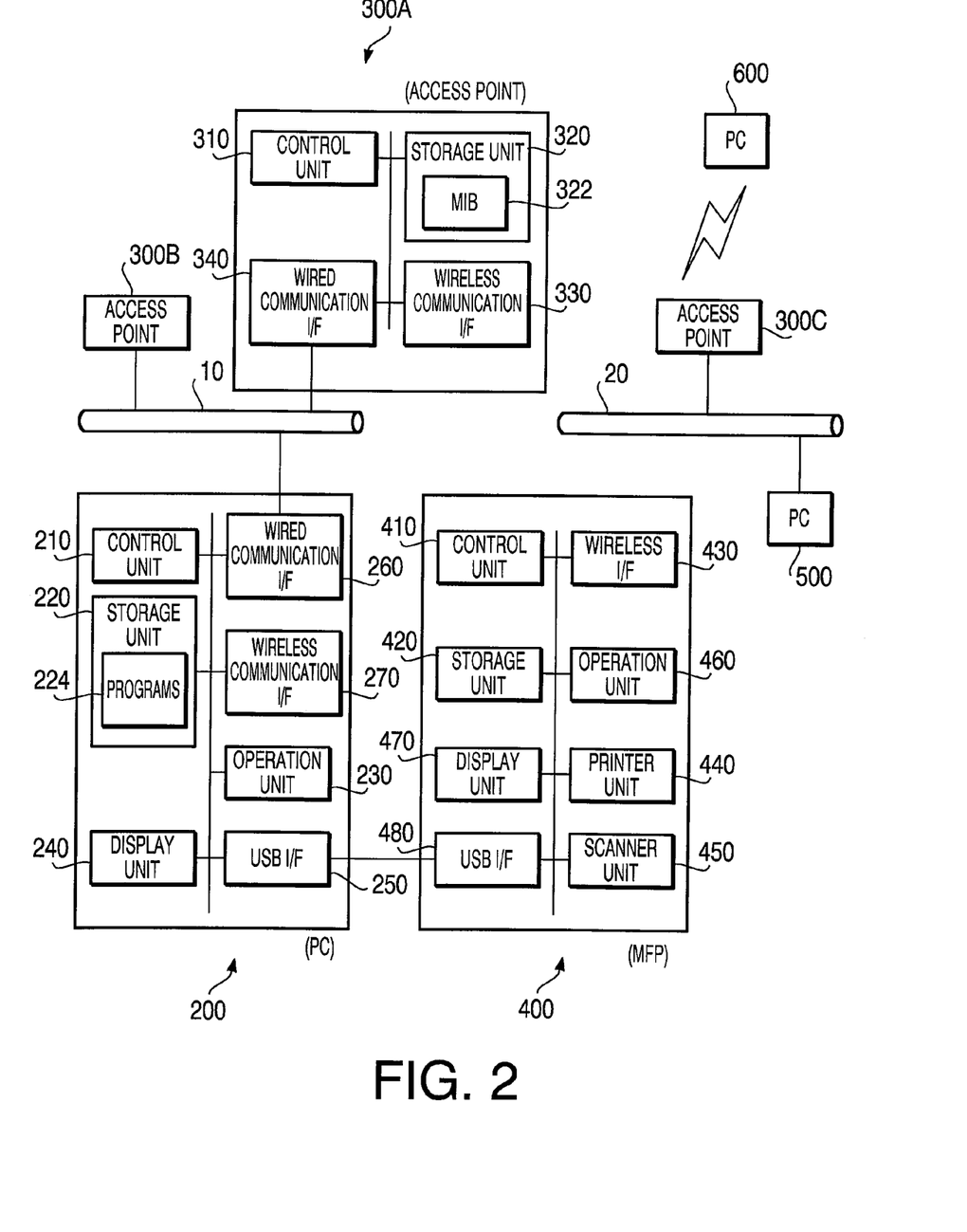
FIG. 2 is a block diagram to illustrate the network system with device components according to the embodiment of the present invention.

FIG. 2 is a block diagram to illustrate the network system with communication devices according to the embodiment of the present invention. According to the present embodiment, the access points 300B, 300C are configured to have same functionalities as the access point 300A and therefore serve similarly to the access point 300A in the network system. Therefore, detailed description and illustration of the access points 300B, 300C are represented by those of the access point 300A. The PCs 500, 600 are configured substantially similarly to the PC 200; therefore, description and illustration of the PCs 500, 600 are herein omitted. The access points 300B, 300C, and the PCs 500, 600 are respectively known access points and a personal computer.

The configuration of the PC 200 will be described. The PC 200 is a known personal computer and includes a control unit 210, a memory unit 220, an operation unit 230, a display unit 240, a USB interface 250, a wired communication interface (I/F) 260, and a wireless communication interface (I/F) 270. The control unit 210 includes, for example, a CPU, a ROM, and a RAM and controls behaviors of the PC 200 itself. The memory unit 220 is a data storage to store programs 224 which are run to install the wireless settings of the PC 200. The memory unit 220 may be, for example, a hard disk. The CPU in the control unit 210 processes data, which is entered through the USB interface 250 and the operation unit 230, stored in the ROM, and develops the programs 224 stored in the memory unit 220 in the RAM to run, the PC 200 is controlled to provide its functions to the user.

The operation unit 230 provides an input interface to the user entering instructions for running the programs 224 to the PC 200. The operation unit 230 includes, for example, a keyboard and a mouse. The display unit 240 displays information concerning operations performed in the PC 200. The USB interface 250 provides an interface to connect the PC 200 to USB-enabled external devices. The wired communication interface 260 provides an interface to connect the PC 200 to the wired network. The wireless communication interface 270 provides an interface to wirelessly connect the PC 200 to the wireless network in an infrastructure mode and in an ad-hoc mode. In FIG. 2, the PC 200 is connected to the IP network 10 through the wired communication interface 260. However, the IP network 10 may be either wired or wireless communication network. Therefore, when the IP network 10 is a wireless network, the PC 200 is connected to the IP network through the wireless communication interface 270 rather than the wired communication interface 260 as shown in FIG. 2. In the present embodiment, the CPU in the control unit 210 executes one of the programs 224 stored in the ROM and the storage unit 220 by use of data obtained through the operation unit 230, the wired communication interface 260, and the wireless communication interface 270 so that required processing of various data is achieved.

The configuration of the access point 300A will be described. The access point 300A is a known access point and includes a control unit 310, a storage unit 320, a wireless communication interface (I/F) 330, and a wired communication interface (I/F) 340. The control unit 310 includes a CPU, a ROM, and a RAM and controls behaviors of the access point 300A. The storage unit 320 is a data storage to store information concerning wireless communication settings of the access point 300A. The information to be stored includes an SSID being an identifier to identify the wireless network, a valid authentication method, an encryption method, and a network key. The storage unit 320 includes an MIB (Management Information Base) 322, which is a database to be managed according to SNMP (Simple Network Management Protocol). The storage unit 320 may be, for example, an EEPROM. The wireless communication interface 330 provides an interface to external devices to be wirelessly connected with the access point 300A. Data to be exchanged with the external devices are transmitted and received through the wireless communication interface 330. The wired communication interface 340 is an interface to connect the access point 300A with wired IP network 10.

The configuration of the MFP 400 will be described. The MFP 400 includes a control unit 410, a storage unit 420, a wireless communication interface (I/F) 430, a printer unit 440, a scanner unit 450, an operation unit 460, a display unit 470, and a USB interface 480. The control unit 110 controls behaviors of the MFP 400 itself. The control unit 110 includes, for example, a CPU being an arithmetic processor, a ROM to store various programs to manipulate the MFP 400, and a RAM being a workspace for the processor. The storage unit 430 is a data storage to store information concerning wireless communication settings of the MFP 400 and may be a non-volatile memory (e.g., an EEPROM) and a hard disk.

The wireless interface 420 in the MFP 400 is an interface to connect the MFP 400 to, for example, the access point 300A wirelessly in an infrastructure mode. The printer unit 440 prints an image according to image data, for example, transmitted from the PC 200 or entered through the scanner unit 450. The scanner unit 450 scans an image formed on an original document which is placed on a document holder (not shown). The operation unit 460 provides an interface for data input by a user and includes, for example, input keys such as direction keys, numerical keys, an enter key, and a cancel key. The display unit 470 displays various information concerning operations in the MFP 400. The USB interface (I/F) 480 provides an interface to other USB-enabled devices to be connected with the MFP 400.

When the CPU runs a program stored in the ROM, operations to manipulate the MFP 400 are performed. In this regard, various data, for example, data exchanged with an external device through the wireless communication interface 420 and entered through an operation unit 460, is stored in the RAM. The stored data is processed by the CPU which accesses the RAM. The CPU develops the programs stored in the ROM in the RAM to run so that the MFP 400 is controlled to provide its functions to the user.

Hereinafter, a flow of the PC 200 to install the wireless settings in the MFP 400, so that the MFP 400 is connected with the access point 300A, will be described. Wireless connection between the access point 300A and the MFP 400 is established when the installation processes complete. Thereafter, the MFP 400 is allowed to communicate with the PC 200 to receive, for example, print data transmitted from the PC 200 to print and transmit image data scanned by the scanner unit 150 of the MFP 400 to the PC 200.

The wireless settings installation process in the MFP 200 will be described with reference to FIGS. 3 and 4. The flow starts when the control unit 210 of the PC 200 detects an instruction to start the flow, which is entered by a user through the operation unit 230. The control unit 210 activates the program 224 installed in the storage unit 220 and displays a user interface window to select a device in which the wireless settings are to be installed in the display unit 240. When the user enters selection of a device through the operation unit 230, in S100, the control unit 210 obtains the selected device to be a target device, in which the wireless settings are to be installed. In the user interface window, devices connected to the PC 200 through the USB interface 250 and having been known to the control unit 210 are presented in a list. The devices connected to the PC 200 through the USB interface 250 can be detected by an emulator equipped to the OS (operating system) running in the PC 200. When solely one device is connected to the PC 200 through the USB interface 250, the user's selection is not necessarily required, but the control unit 210 may automatically determine the connected device to be the device in which the wireless settings are to be installed.

Following S100, in S102, the control unit 210 transmits an instruction to search for wireless networks to the target device determined in S100 through the USB interface 250. In the present embodiment, the target device is the MFP 400 (see FIG. 1). After the transmission and until replies for the search are received, the control unit 210 displays a message indicating that the PC 200 is in search for the wireless networks in the display unit 240.

Meanwhile, the control unit 410 of the MFP 400 receives the instruction provided by the PC 200 through the USB interface 480. Accordingly, the MFP 400 manipulates the USB interface 480 and searches for external devices in the vicinity of the MFP 400 itself. In the present embodiment, the access points 300A, 300C are detected (see FIG. 1). The access points 300A, 300C are detected, for example, when the control unit 410 of the MFP 400 receives the beacon signals output from the access points 300A, 300C. Further, the control unit 410 extracts SSIDs of the access points 300A, 300C from the beacon signals and generates a search result including the SSIDs. The generated search result is transmitted to the PC 200 by the control unit 410 of the MFP 400 through the USB interface 480. In this regard, when an external device (not shown) operated in the ad-hoc mode in a wireless network is present in the range, in which the MFP 400 can receive its beacon signals, the control unit 110 can receive the beacon signals output from the external device. Thus, the control unit 410 obtains the SSID of the wireless network including the external device operated in the ad-hoc mode and generates the search result including the SSID of the external device.

In S104, the control unit 210 of the PC 200 receives the search result provided by the MFP 400 through the USB interface 250 and stores the search result in the RAM. In S106, the control unit 210 searches the IP network 10, to which the PC 200 belongs, for access points belonging to the same sub-network as the PC 200 itself. When the access points are detected in the same network, the control unit 210 obtains the SSIDs of the detected access points. In the present embodiment, the SSIDs of the access points 300A, 300B are obtained (see FIG. 1).

When the control unit 210 of the PC 200 searches the IP network 10 in S106, first, the control unit 210 broadcasts a request (Get request) specifying a first object ID (hereinafter, OID) and a second OID over the IP network 10 through the wired communication interface 260 by use of the SNMP protocol. The first OID is an object ID identifying a type of a device connected to the IP network 10. The type of the device is registered in the MIB of the storage unit of the device. The second OID indicates an SSID of the wireless network to which the device belongs. In this regard, when the IP network 10 is a wireless network, the request is broadcasted from the PC 200 through the wireless communication interface 270. When, for example, the access point 300A in the IP network 10 receives the request, the control unit 310 of the access point 300A interprets the OIDs included in the request, obtains information corresponding to the OIDs from the MIB 322, and transmits a response including the obtained OIDs to the PC 200 (Get response). Other devices, e.g., the access point 300B, receiving the same request, behave similarly to the access point 300A. In this regard, the request is not broadcasted over the IP network 20; therefore, the access point 300C neither receives the request nor is detected by the control unit 210.

Following S106, in S108, the control unit 210 executes an SSID selection process, which will be described later in detail, and proceeds to S110. In S110, the control unit 210 displays a user interface window for entering authentication settings. FIG. 4 illustrates the authentication settings entry window to be displayed in S110. The authentication settings entry window includes entry boxes for the user to enter a wireless communication mode ("Mode" box), an authentication method ("Authentication" box), an encryption method ("Encryption" box), and a network key ("Network Key" box).

In an SSID box, which appears on a top line in the authentication settings entry window, an SSID determined in the SSID selection process in S108 and stored in the RAM of the control unit 210 is presented by default. In the Mode box, a wireless communication operation mode, which is one of the infrastructure mode and the ad-hoc mode, corresponding to the SSID inputted in the SSID box is presented by default. The authentication method and the encryption method can be selectively entered among a plurality of options. For example, the authentication method may be one of "open," "Shared-key," "WPA-PSK," and "WPA2-PSK." The encryption method may be one of "no encryption," "WEP," "TKIP," and "AES." These options may be presented to the user in pull-down menus. An arbitrary string of characters representing the network key can be entered by the user through the operation unit 230. Hereinafter, the authorization method, the encryption method, and the network key will be collectively referred to as "authorization settings".

When the user fills in the boxes for the authentication settings and presses an OK button to confirm the authentication settings, in S112, the control unit 210 stores the entered information in a predetermined area in the RAM. In 5114, the control unit 210 transmits the SSID and the authentication settings in the RAM to the MFP 400 through the USB interface 250. The flow ends thereafter. The MFP 400, meanwhile, receives the SSID and the authentication settings through the USB interface 480 and stores the received information to be the wireless settings in the storage unit 420.

In the above flow, the PC 200 is connected with the MFP 400 through the USB interfaces 250, 480. Alternatively, the PC 200 and the MFP 400 may be connected with each other wirelessly. Additionally, the PC 200 and the MFP 400 may be connected through the IP network 10. The communication between the PC 200 and the MFP 400 can be established through the wired communication interface 260 of the PC 200 and a wired communication interface (not shown) of the MFP 400 when the IP network 10 is a wired network. When the PC 200 and the MFP 400 may be connected through the IP network 10, in S100, the control unit 210 of the PC 200 broadcasts a packet to search for devices over the IP network 10. When replies are received, the control unit 210 presents a list of the responsive devices through the display unit 240 so that the user can select one of the responsive devices. The selected device becomes the target device. Alternatively, the user may directly enter an IP address of a target device. The control unit 210 may determine the target device based on the entered IP address.

Figure 5:
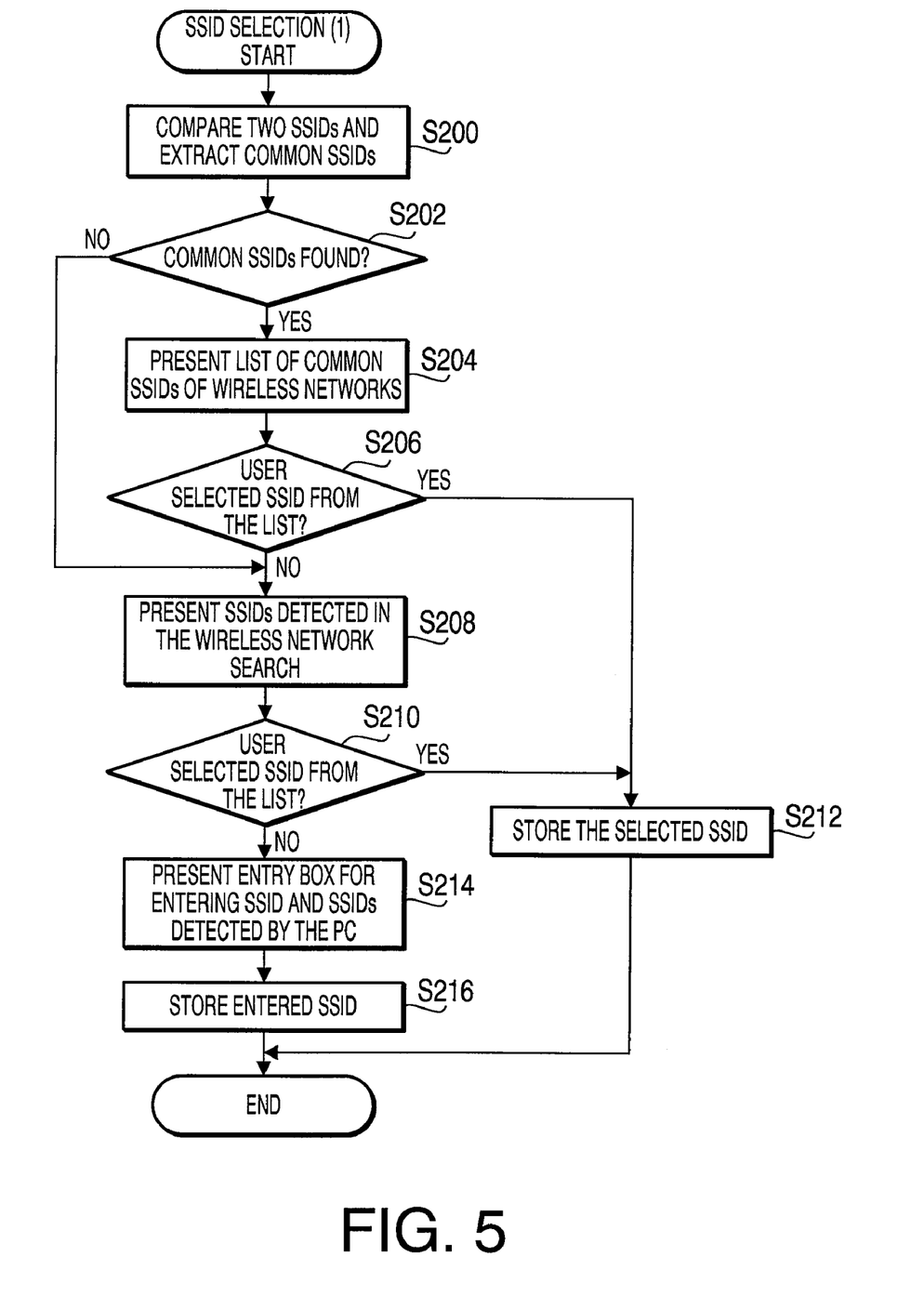
FIG. 5 is a flowchart to illustrate an SSID selection process according to a first embodiment of the present invention.

Next, a first embodiment of the SSID selection process in S108 in the wireless settings installation process will be described with reference to FIGS. 5 and 6. In S200, the control unit 210 compares the SSID included in the search result, obtained from the MFP 400 (see S104 in FIG. 3), and the SSIDs obtained from the IP network 10 by the PC 200 itself according to the SNMP protocol (see S106 in FIG. 3). When the comparison finds commonly included SSIDs, the control unit 210 extracts the common SSIDs. In S202, the control unit 210 judges as to whether the common SSIDs are extracted. When no common SSID is extracted (S202: NO), the flow proceeds to S208. When the common SSIDs are extracted (S202: YES), in S204, the control unit 210 presents a list of wireless networks identified by the common SSIDs through the display unit 240. The common SSIDs will be hereinafter referred to as "first SSIDs." In the present embodiment, the first SSID refers to the SSID of the access point 300A.

In the present embodiment, the MFP 400 is capable of receiving the beacon signals from the access points 300A, 300C whilst, the beacon signals from the access point 300B are not receivable to the MFP 400. Therefore, the search result obtained in S104 in the wireless settings installation process (FIG. 3) includes the SSIDs of the access points 300A, 300C, but not the SSID of the access point 300B. Meanwhile, the PC 200 is capable of obtaining the SSIDs of the access points 300A, 300B connected to the IP network 10 to which also the PC 200 belongs, but incapable of obtaining the SSID of the access point 300C connected to the IP network 20, which is a different IP network from the IP network 10. Therefore, the first SSID, which is common to the MFP 400 and PC 200, is solely the SSID of the access point 300A.

Figure 6A:
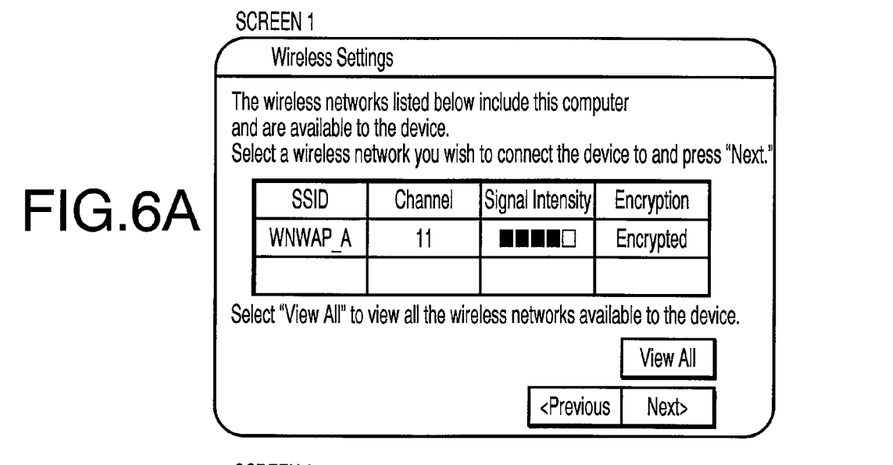
FIGS. 6A-6C are illustrative views of user interfaces to be presented to a user in the SSID selection process according to the first embodiment of the present invention.

The list of wireless network identified by the SSID of the access point 300A being the first SSID is illustrated in FIG. 6A (Screen 1). In Screen 1, the list presents the first SSID "WNWAP_A" and accompanying information concerning the first SSID, which is a channel number of radio waves used in the wireless network with the SSID "WNWAP_A," indication of intensity of the radio waves, and usage of an encryption method. When two or more SSIDs are extracted in S200 (FIG. 5), all of the extracted SSIDs and the accompanying information are presented in the list. When "View All" button is pressed by the user through the operation unit 230, all the wireless networks available to the MFP 400 (i.e., the SSIDs included in the search result) are displayed in the list. In particular, the SSIDs of the access points 300A, 300C, which are "WNWAP_A" and "WNWAP_C" respectively, are displayed. In the present embodiment, a "device" in Screen 1 refers to the MFP 400. When "Previous" button in Screen 1 is pressed by the user through the operation unit 230, a predetermined screen, which lead the user to Screen 1 previously, is displayed in the display unit 240.

In S206, the control unit 210 judges as to whether the user selects one of the SSIDs listed in Screen 1. The user's selection can be entered through the operation unit 230. In the present embodiment, the solely one SSID of the access point 300A is presented to be selected. When the user's selection is entered, in particular, when the user selects the first SSID "WNWAP_A" of the access point 300A and presses "Next" button in Screen 1 through the operation unit 230 (S206: YES), the flow proceeds to S212. When the user's selection is not entered, in particular, when the user presses "View All" button through the operation unit 230 (S206: NO), the flow proceeds to S208. In S208, the control unit 210 displays a list of wireless networks in the display unit 240. The list to be displayed in S208 includes the SSIDs included in the search result obtained from the MFP 400 in S104 (FIG. 3). The flow proceeds to S210.

Figure 6B:
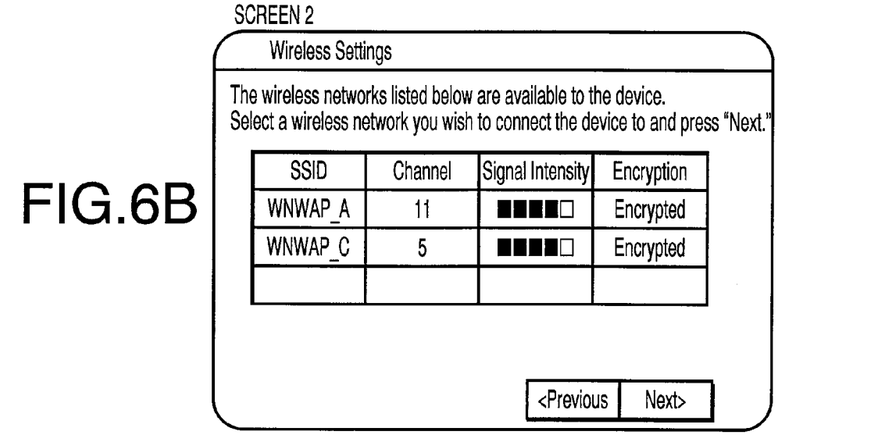
Figure 6C:
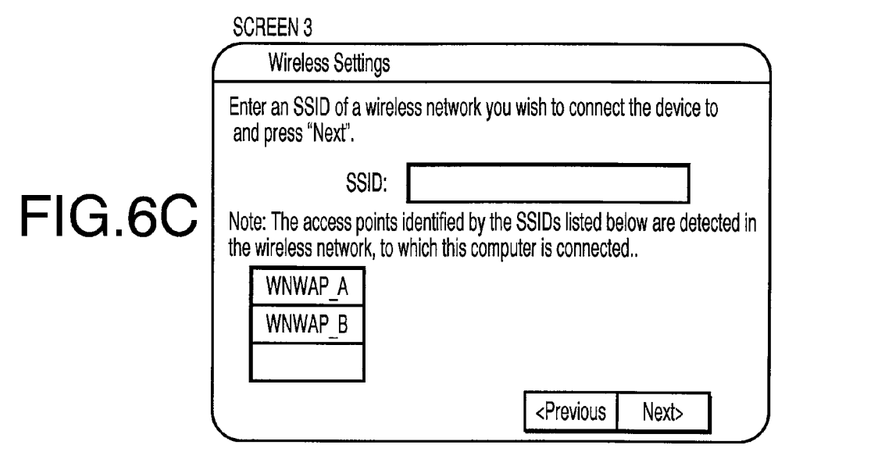

The list of wireless networks to be displayed in S208 is illustrated in FIG. 6B (Screen 2). The list includes the SSID of the access point 300C, which is obtained through the beacon signals received in S102 (FIG. 3) and included in the search result, but not detected within the IP network 10 by the PC 200 in S106. The SSID obtained through the beacon signals and included in the search result from the MFP 400 but not detected by the PC 200 will be hereinafter referred to as a "second SSID." In the present embodiment, therefore, a second SSID "WNWAP_C" of the access point 300C identifying the wireless network 30 is displayed in addition to the first ID "WNWAP_A." The SSID of the access point 300B, which cannot be detected by the MFP 400, is not included in the list in Screen 2. The SSID of the access point 300B, which is outside the communication range of the MFP 400, is not included in the list so that the access point unavailable to the MFP 400 should not be selected by the user.

When "Previous" button in Screen 2 is pressed by the user through the operation unit 230, Screen 1 with the list of wireless networks with the first SSIDs is displayed in the display unit 240. The items of information to be included in the list displayed in Screen 2 are similar to the items included in the list displayed in Screen 1 except "View All" button; therefore, description of the items is herein omitted.

In S210, the control unit 210 judges as to whether the user selects one of the SSIDs listed in Screen 2. When the user's selection is entered, in particular, when the user selects one of the SSIDs listed in Screen 2, which are the first SSID "WNWAP_A" of the access point 300A and the second SSID "WNWAP_C" of the access point 300C, and presses "Next" button in Screen 2 through the operation unit 230 (S210: YES), the flow proceeds to S212. In S212, the control unit 210 stores the SSID selected in S206 or S210 in the RAM. The flow ends thereafter.

When the user's selection is not entered, in particular, when the user presses "Next" button through the operation unit 230 without selecting any SSID (S210: NO), in S214, the control unit 210 displays an entry box in the display unit 240. The entry box to be displayed in the display unit 240 in S214 is illustrated in FIG. 6C (Screen 3). The user can directly enter an SSID of the wireless network, to which the MFP 400 is to be connected, through the operation unit 230. Additionally, in Screen 3, the SSIDs of the access points 300A, 300B, which were detected within the IP network 10 by the PC 200 according to SNMP protocol in S106 (FIG. 3), are displayed for the user's reference. The SSID "WNWAP_B" displayed in Screen 3 is the SSID of the access point 300B detected by the control unit 210 in S106 according to SNMP protocol. The SSID of the access point detected in S106 according to SNMP protocol will be hereinafter referred to as a "third SSID."

When "Previous" button in Screen 3 is pressed by the user through the operation unit 230, Screen 2 including the list of wireless networks is displayed in the display unit 240. When the user enters an SSID of the wireless network to which the MFP 400 is to be connected through the operation unit 230 and presses "Next" button, in S216, the control unit 210 stores the entered SSID in the RAM. The flow ends thereafter.

Figure 7:
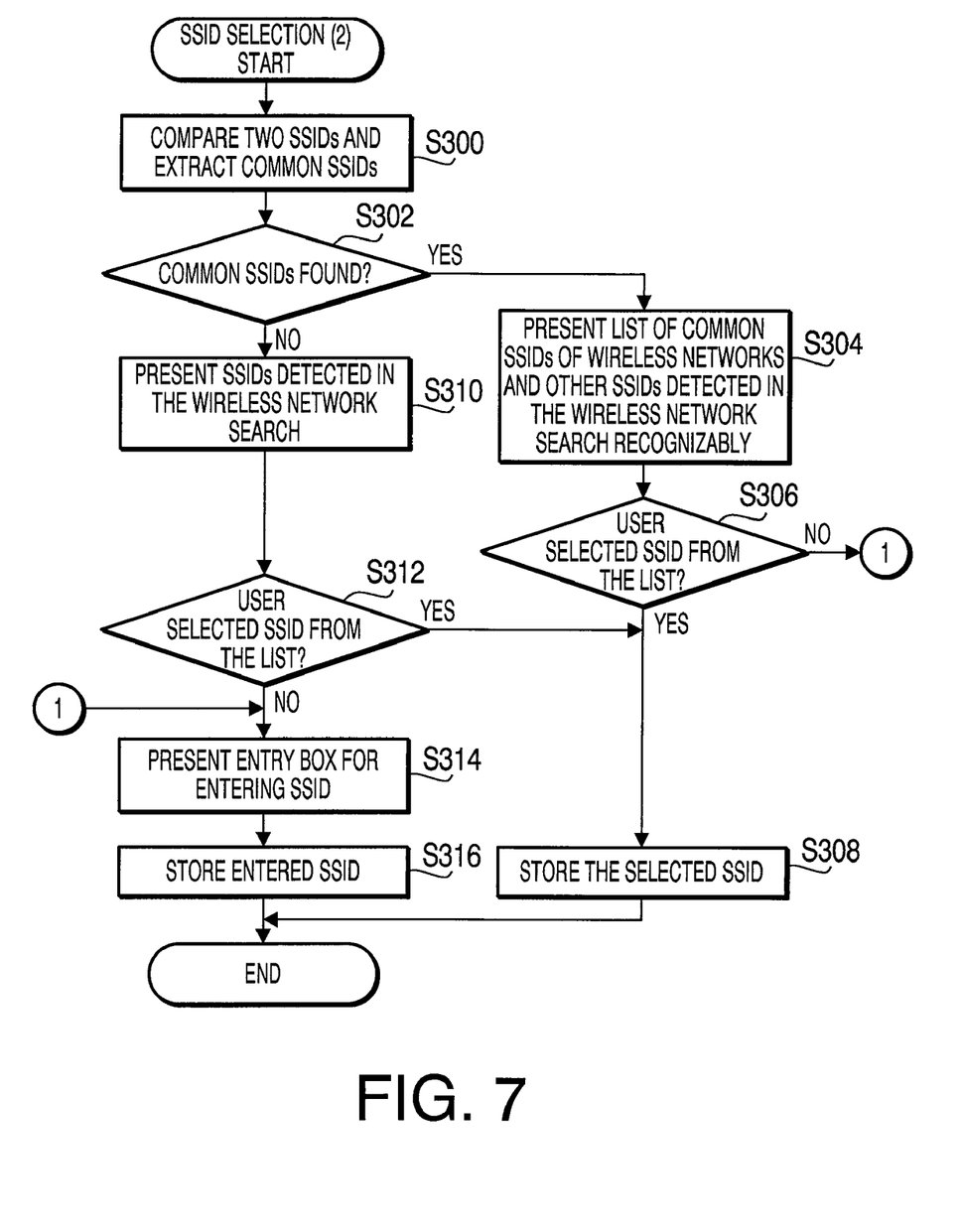
FIG. 7 is a flowchart to illustrate the SSID selection process according to a second embodiment of the present invention.

Next, a second embodiment of the SSID selection process in S108 in the wireless settings installation process will be described with reference to FIGS. 7 and 8. In the second embodiment, description of behaviors of the control unit 210 similar to those in the SSID selection process in the first embodiment will be omitted.

In the SSID selection process in the second embodiment, S300 and S302 are similar to S200 and S202 in FIG. 5 respectively. The flow proceeds to S304 or to S310. In S302 when the first SSIDs are extracted (S302: YES), in S304, the control unit 210 displays the list of wireless networks. In this regard, the first SSID of the access point 300A extracted in S300 and the second SSID of the access point 300C detected by the PC 200 according to SNMP protocol in a same screen. However, the first SSID is presented to be distinguished from the second SSID.

Figure 8A:
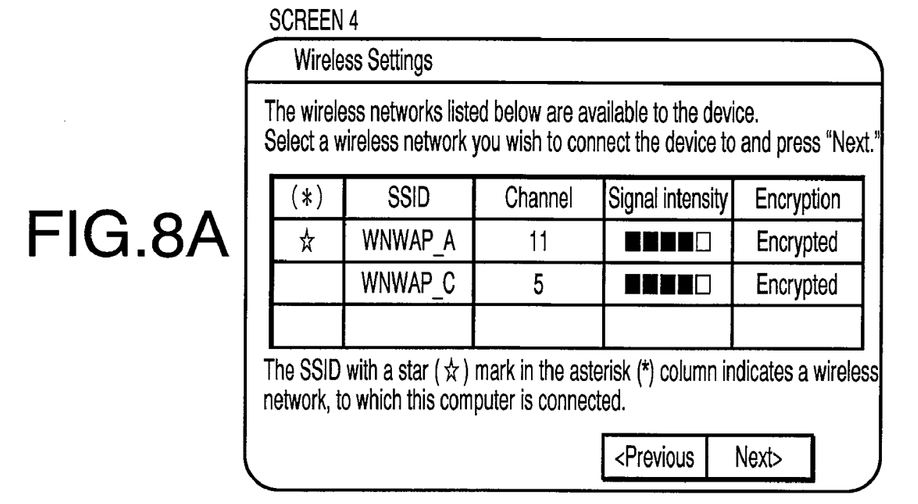
FIGS. 8A-8B are illustrative views of user interfaces to be presented to the user in the SSID selection process according to the second embodiment of the present invention.
Figure 8B:
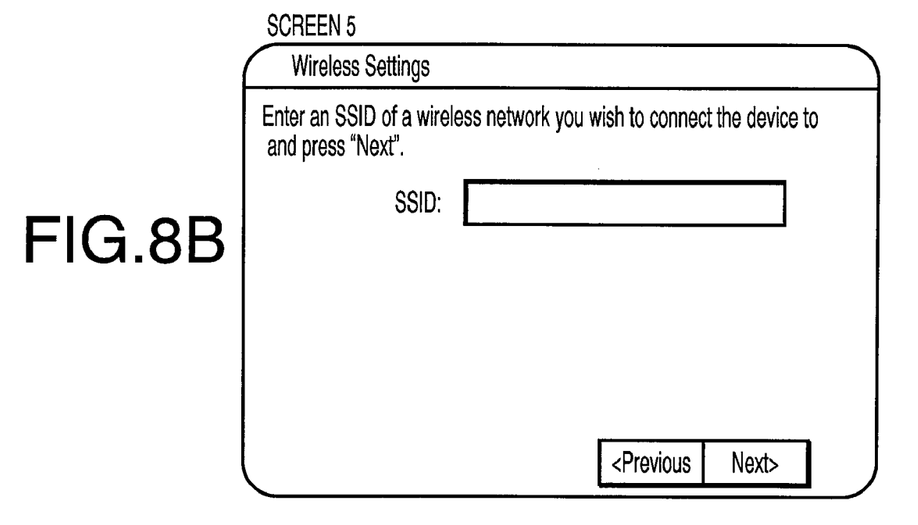

The list of wireless networks to be displayed in S304 is illustrated in FIG. 8A (Screen 4). The list includes the first SSID of the access point 300A "WNWAP_A" and the second SSID of the access point 300C "WNWAP_C." In this regard, a "star" mark, which indicates the first SSID, is appended to the first SSID "WNWAP_A." The third SSID, which is unavailable to the MFP 400, is not included in the list in Screen 4. Further, "View All" button, which appears in Screen 1 (FIG. 6A) in S204 (FIG. 5) of the SSID selection process according to the first embodiment, is not included in Screen 4 appearing in S304 in the second embodiment. Other than absence of the "View All" button, the items of information to be included in the list displayed in Screen 4 are similar to the items included in the list displayed in Screen 1; therefore, description of the items is herein omitted.

In S306, the control unit 210 judges as to whether the user selects one of the SSIDs listed in Screen 4. When the user's selection is entered (S306: YES), in S308, the control unit 210 stores the selected SSID in the RAM. The flow ends thereafter. When the user's selection is not entered, but the user presses "Next" button through the operation unit 230 (S306: NO), the flow proceeds to S314.

In S302, when no common SSID is extracted (S302: NO), the control unit 210 executes S310 and S312, which are similar to S208 (FIG. 5) and S210 (FIG. 5) respectively. When affirmative judgment is made in S312 (S312: YES), the control unit 210 executes S308.

In S314, the control unit 210 displays an entry box in the display unit 240. The entry box to be displayed in the display unit 240 in S314 is illustrated in FIG. 8B (Screen 5). The user can directly enter an SSID of the wireless network, to which the MFP 400 is to be connected, through the operation unit 230. When "Previous" button in Screen 5 is pressed by the user through the operation unit 230, Screen 4 including the list of wireless networks is displayed in the display unit 240. When the user enters an SSID of the wireless network to which the MFP 400 is to be connected through the operation unit 230 and presses "Next" button, in S316, the control unit 210 stores the entered SSID in the RAM. The flow ends thereafter.

Figure 3:
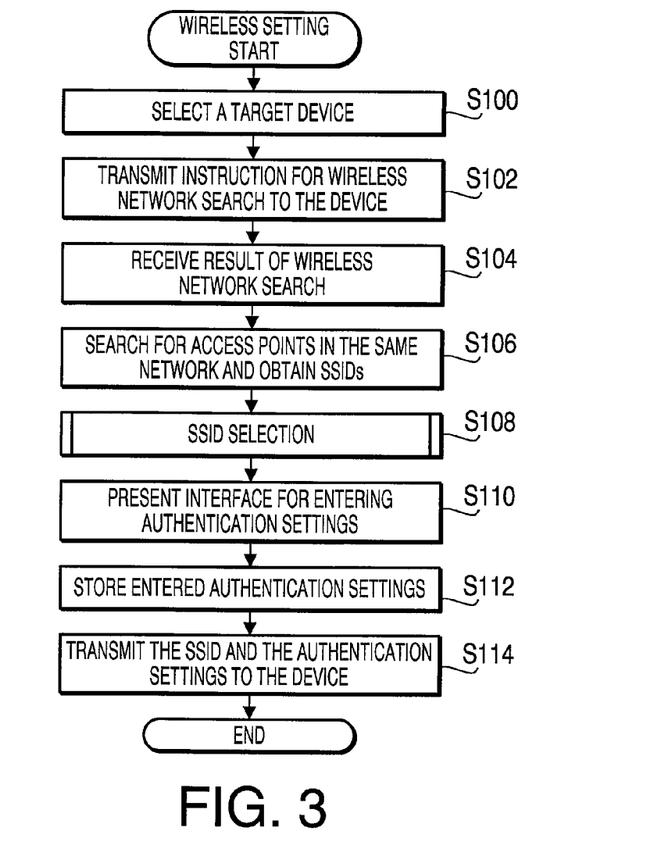
FIG. 3 is a flowchart to illustrate a wireless settings installation process according to the embodiment of the present invention.
Figure 4:
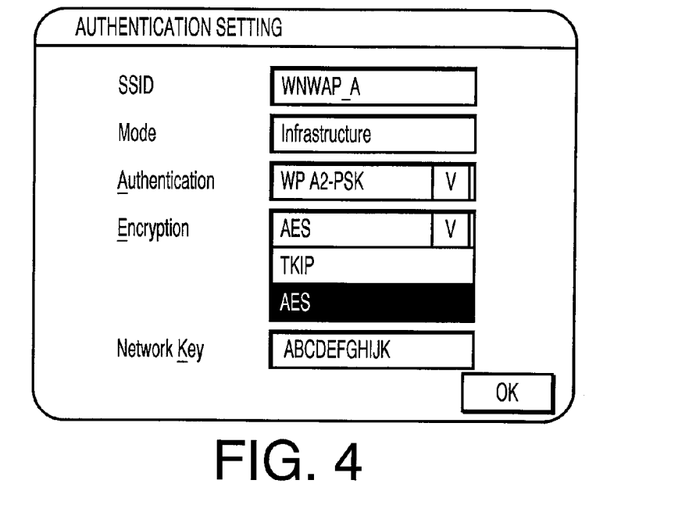
FIG. 4 is an illustrative view of a user interface for entering authentication settings to a PC (personal computer) according to the embodiment of the present invention.

In the above embodiments, the control unit 210 of the PC 200 compares the SSIDs, which were detected by the MFP 400 in the wireless search operation (S104 in FIG. 3), and the SSIDs of the access points within the same sub-network as the PC 200 itself and detected by the PC 200 according to SNMP protocol (S106 in FIG. 3). When common SSIDs, i.e., the first SSIDs, are detected as a result of the comparison, the control unit 210 displays the first SSIDs in a list in the display unit 240 of the PC 200 in a manner such that the first SSIDs are distinguished from the second IDs, which are the SSIDs detected solely by the MFP 400. In this regard, the third SSIDs, which are unavailable to the MFP 400, are not included in the list.

According to the above configuration, upon selecting a wireless network to which the MFP 400 should be connected, options of external devices (e.g., the access point 300A), connected to the IP network 10 including the PC 200, and settled in the range receivable of the radio waves for the MFP 400, can be recognizably presented to the user. These external devices, belonging to the IP network 10 available to the PC 200, and located in to the receivable range for the MFP 400, are likely to be selected as the devices with which the MFP 400 should establish connection. Therefore, these external devices are presented through the display unit 240 of the PC 200 preferentially over the other external devices, which do not belong to the same wireless network as the PC 200.

Although examples of carrying out the invention have been described, those skilled in the art will appreciate that there are numerous variations and permutations of the communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiments, the wireless settings installation process is executed by the control unit 210 of the PC 200. However, the process may be executed by the control unit 410 of the MFP 400. When the process is executed by the control unit 410, the MFP 400 may be connected to the IP network 10 through a wired communication interface. Further, the MFP 400 may have a program for the wireless settings installation process stored in the ROM of the control unit 410 and in the storage unit 420 to execute. During the wireless settings installation process, the control unit 410 searches the IP network 10, to which the MFP 400 belongs, for access points belonging to the same sub-network similarly to the control unit 210 in S106 (FIG. 3).

When the wireless settings installation process is executed by the control unit 410, however, S100, S102, and S114 (FIG. 3) are omitted. Further, the result of searching for the wireless network generated by the control unit 410 in accordance with the instruction in S102 is stored in the RAM of the control unit 410 to be used in the succeeding steps. Furthermore, the control unit 410 stores the authentication settings, which are the wireless communication settings entered through the entry window displayed in S110, in the storage unit 420 (S112 in FIG. 3).

What is claimed is:

1. A wireless communication device, comprising:
 a processing unit;
 a memory storing computer readable instructions that, when executed by the processing unit, cause the wireless communication device to:
  obtain, in a first process, an identifier of a wireless network, the identifier of the wireless network being obtained through detection of a beacon signal;
  obtain, in a second process, an identifier of a wireless network without using a beacon signal, the identifier of the wireless network being obtained through an IP network to which the wireless communication device has been connected; and
  output a first identifier obtained commonly in the first and second processes to an output unit so that the first identifier is presented to be distinguishable from other identifiers obtained in solely one of the first process and the second process.

2. The wireless communication device according to claim 1, 
wherein the other identifiers include a second identifier obtained solely in the first process; and
wherein the second identifier is output to the output unit along with the first identifier.

3. The wireless communication device according to claim 1, wherein the other identifiers are not output to the output unit.

4. The wireless communication device according to claim 1,
wherein the other identifiers include a second identifier obtained solely in the second process; and
wherein the second identifier is not output to the output unit.

5. The wireless communication device according to claim 1, wherein, in the second process, the identifier is obtained by use of SNMP protocol.

6. The wireless communication device according to claim 2, wherein the second identifier corresponds to a second wireless network; and
wherein the memory stores further computer readable instructions, that when executed by the processing unit, further cause the wireless communication device to:
connect, when the first identifier and the second identifier are output to the output unit, the wireless communication device to one of the first and second wireless networks selected by a user from the first and second identifiers.

7. A computer readable storage device storing computer readable instructions that, when executed by a computer, cause a wireless communication device to:
obtain, in a first process, an identifier of a wireless network, the identifier of the wireless network being obtained through detection of a beacon signal;
obtain, in a second process, an identifier of a wireless network without using a beacon signal, the identifier of the wireless network being obtained through an IP network to which the wireless communication device has been connected; and
output a first identifier obtained commonly in the first obtaining process and the second obtaining process to an output unit so that the first identifier is presented to be distinguishable from other identifiers obtained in solely one of the first obtaining and the second obtaining process.

8. The computer readable storage device according to claim 7,
wherein the other identifiers include a second identifier obtained solely in the first obtaining process; and
the outputting step outputs the second identifier to the output unit along with the first identifier.

9. The computer readable storage device according to claim 7, wherein the second obtaining process includes obtaining the identifier using SNMP protocol.

10. The computer readable storage device according to claim 7, wherein:
the outputting step further includes outputting a second identifier obtained in only one of the first obtaining process and the second obtaining process, to the output unit so that the first identifier and the second identifier are presented to be distinguishable from each other, and
when the outputting step outputs the first identifier and the second identifier to the output unit, connecting the wireless communication device to a wireless network selected by a user from the first and second identifiers.

11. The computer readable storage device according to claim 7, wherein the outputting step includes:
comparing the identifier obtained in the first obtaining process to the identifier obtained in the second obtaining process; and
in response to determining that the identifier obtained in the first obtaining process is the same as the identifier obtained in the second obtaining process, setting the first identifier as one of the identifier obtained in the first obtaining process and the identifier obtained in the second obtaining process.

* * * * *

UNITED STATES PATENT AND TRADEMARK OFFICE
CERTIFICATE OF CORRECTION

| | |
|---|---|
| PATENT NO. | : 8,320,347 B2 |
| APPLICATION NO. | : 12/630132 |
| DATED | : November 27, 2012 |
| INVENTOR(S) | : Tomomi Shiraki |

It is certified that error appears in the above-identified patent and that said Letters Patent is hereby corrected as shown below:

In the Claims

In Column 12, Claim 7, Line 8:
Please delete "obtaining and" and insert --obtaining process and--

Signed and Sealed this
Tenth Day of September, 2013

Teresa Stanek Rea
*Acting Director of the United States Patent and Trademark Office*